United States Patent
Dahlquist et al.

(10) Patent No.: US 7,082,348 B1
(45) Date of Patent: Jul. 25, 2006

(54) COMPUTER BASED METHOD AND SYSTEM FOR CONTROLLING AN INDUSTRIAL PROCESS

(75) Inventors: Erik Dahlquist, Västerås (SE); Thomas Liljenberg, Västerås (SE); Stefan Backa, Västerås (SE)

(73) Assignee: ABB AB, Vasteras (SE)

( * ) Notice: Subject to any disclaimer, the term of this patent is extended or adjusted under 35 U.S.C. 154(b) by 689 days.

(21) Appl. No.: 10/089,068

(22) PCT Filed: Oct. 4, 2000

(86) PCT No.: PCT/SE00/01917

§ 371 (c)(1), (2), (4) Date: Apr. 5, 2002

(87) PCT Pub. No.: WO01/25862

PCT Pub. Date: Apr. 12, 2001

(30) Foreign Application Priority Data

Oct. 5, 1999 (SE) .................................. 9903606

(51) Int. Cl.
*G06F 7/66* (2006.01)

(52) U.S. Cl. ..................... 700/128; 700/31; 700/44; 700/266; 700/270; 703/2; 162/232; 162/238

(58) Field of Classification Search .................. 700/31, 700/44, 128, 266, 270; 703/2; 162/232, 162/238
See application file for complete search history.

(56) References Cited

U.S. PATENT DOCUMENTS

| 4,630,189 A | 12/1986 | Ohmori et al. |
| 4,755,925 A | 7/1988 | Tsuchiya et al. |
| 5,375,448 A | 12/1994 | Katayama et al. |
| 5,402,333 A * | 3/1995 | Cardner ........................ 700/31 |

FOREIGN PATENT DOCUMENTS

| JP | 7-256537 | 10/1995 |
| WO | 9504878 | 2/1995 |

* cited by examiner

*Primary Examiner*—Albert W. Paladini
*Assistant Examiner*—Sheela S. Rao
(74) *Attorney, Agent, or Firm*—Oblon, Spivak, McClelland, Maier & Neustadt, P.C.

(57) ABSTRACT

A computer based method for controlling an industrial process that includes at least two unit processes, including the steps of directly controlling the process by a control model including one or more algorithms, and automatic diagnosis of the validity of the process data retrieved from the process for the purpose of preventing irrelevant process data from being used as an input in the control model.

52 Claims, 4 Drawing Sheets

COMPUTER BASED METHOD AND SYSTEM FOR CONTROLLING AN INDUSTRIAL PROCESS

FIELD OF THE INVENTION

The present invention relates to a computer based method for controlling an industrial process which comprises at least two unit processes comprising the steps of directly controlling the process by means of a model comprising one or more algorithms and delivering process data from the process to the control model.

The invention also relates to a computer based system for controlling an industrial process which comprises at least two unit processes, said system comprising a model comprising one or more algorithms for directly controlling the process and means for delivering process data from the process to the control model, the operation of the control model being based on said process data.

The industrial process is preferably continuous or semi-continuous and may contain continuous, semi-continuous, and/or discontinuous unit processes, but is still regarded as being continuous or semi-continuous. Even though the invention is applicable to all kinds of continuous and semi-continuous processes, it is particularly used for processes in connection to the manufacture of chemical, petrochemical metal, and polymer products, and pulp and paper production, in which there is a need of controlling the stream compositions in order to obtain the required product properties. The process might also be a process in a power plant. Typical unit processes in a process for the manufacture of pulp and paper are coking, bleaching, stock preparation etc.

BACKGROUND OF THE INVENTION AND PRIOR ART

As the invention is applicable to processes for the manufacture of pulp and paper or board, the invention will be described with reference to such processes.

Material producers, such as producers of pulp, paper, and board, are facing a rapidly changing world. They must meet increasing customer demands for specific grades in smaller batches. Products must meet quality demands specified within narrow limits. The increased environmental awareness is met by large efforts, not only to meet the more stringent demands and regulations set on their activity, but also to minimize the impact of their influence on the environment. Increased recycling within the production process as well as an increased use of reclaimed matter as raw material or additions to the process also put higher demand of the control and supervision of process. Additionally, these producers face a tougher competition, which can only be met with high-quality products.

The product quality is dependent on many parameters which are influenced by the raw material supply to the process, especially the consistency of raw material supply, the additions made during treatments, and the production conditions during these treatments. Thus, the product quality can change substantially throughout these processes. Therefore, methods for process control need to employ a system with sensors or devices for sampling throughout the process line and means to execute measurements and sampling, means to collect, collate, and process information obtained from the process, and means to execute corrective actions in the process.

For processes containing two or more unit processes, an overall optimization of the process is required. The optimization of the process includes an optimization of, for example, the product quality, the total economy, environmental aspects, energy consumption, maintenance of product equipment, etc. A typical example of an optimization is an optimization of the process in order to find optimal set-points for pumps, valves, etc. in the process to achieve a certain production volume during a given period of time under the given conditions. Thereby, the optimization includes the downloading of tank levels, temperatures, etc. on-line from a process computer system into a computer, and using the downloaded values together with algorithms adapted for the optimization and control of the process.

Normally, the values of a plurality of variables in the process will be measured by means of sensors and used as input to the algorithms for the optimization and control of the process. However, every now and then, such measurements will be incorrect due to the malfunctioning of the sensors. Some deviation between measured values and the predicted or real values of the variables in question can be tolerated, but when the error is above a certain level due to the malfunctioning of a sensor, that value should not be used in the optimization algorithm or in the control model of a control system, and the sensor in question should be replaced or repaired in order to make it possible to provide the control system with correct measurements.

Therefore, prior art has proposed different ways of tracking, identifying, and analyzing the malfunctioning or defective sensors. Prior art also suggests ways of tracking, identifying, and analyzing a malfunctioning or defective actuator or controller, or production unit or device.

However, prior art only suggests methods and/or systems that, upon detection of such malfunctioning, provide alarms, but do not propose specific steps or measures taken by the used software of a control system in order to upgrade or adjust itself with regard to malfunctioning sensors or process variations that initially might lead to one or more sensors being deemed as malfunctioning.

OBJECTS OF THE INVENTION

One object of the present invention is to provide a computer based method and system which permits a reliable on-line simulation of and control of an industrial system. The inventive method and system should be suited for advanced model based control of an industrial process. In particular, the invention shall devise ways of detecting and handling erroneous measurements, in particular in-line measurements by sensors, in the process in order to maintain a proper and redundant computer based control of the process.

SUMMARY OF THE INVENTION

This object is achieved by means of the initially defined method, which comprises the further step of executing an automatic diagnose diagnosis of the validity of the process data retrieved from the process for the purpose of preventing irrelevant process data from being used as input in the control model.

Preferably, the process is simulated by means of a separate process model which updates the control model and provides it with set point values for its operation. Preferably, the process is optimized by means of the process model which, with given constraints, will provide the control model with suitable set point values for said optimization with regard to different issues, such as total economy, environmental aspects, product quality, maintenance of process equipment, etc. Preferably, the process model is adapted to modify or replace essential parts of the control model upon reception of certain information, in particular information concerning irrelevant process data that should not be used for the operation of the control model.

According to the inventive method, the process model is provided with process data from the process, the operation of the process model being based on said process data. At least some of said process data is retrieved from the process by means of sensors for in-line, on-line and/or at-line measurement, for example the same measurements as those used as input to the control model. Preferably, the process model is provided with information from the diagnosis for the purpose of preventing irrelevant process data from being used as input in the process model. Hence, the process model, as well as the control model, is continuously upgraded on-line in order to prevent it from using incorrect or irrelevant process data for its operation.

The present invention should provide a computer based method and system which devises a way of diagnosing the performance of sensors in a process, so that the accuracy of the measurements made by said sensors can be validated. The system and method according to the invention should also be adapted as to provide information about the relevance of certain measured values of process variables in order to make it possible to automatically decide whether certain measured values should or should not be included in models for the overall optimization and control of the process, and for the purpose of making it possible to decide whether a certain sensor should be repaired or replace due to malfunctioning. The same applies for defective or malfunctioning process equipment in general.

According to the invention, the above object is achieved by the initially defined method, in which the automatic diagnose diagnosis comprises the steps of executing at least two predictions of a given process variable with different sets of measured variables as input to a model for executing said predictions, observing any deviation between the predicted values and the measured value of said process variable, and evaluating the observed deviation pattern for the purpose of deciding whether the measured value of said variable should or should not be used as input in the control model and/or the process model.

Alternatively, the above object is achieved by the initially defined method, which comprises the further steps of measuring a value of at least two process variables at at least one location in the process, predicting said at least two variables by means of a model for a relevant part of the process, with given boundary conditions, observing any deviation between the measured and predicted value of each process variable, and comparing and evaluating the observed deviations for the purpose of deciding whether the measured values of said variables should or should not be directly used as input to the control model and/or process model. Preferably, each prediction is based on a certain set of input data, i.e. measurements, excluding the measured value of the variable to be predicted. If the values of two variables are measured and predicted, and the measured variables deviate in the same, but acceptable way from the predicted values, it is reasonable to make the conclusion that the sensors for measuring are functioning. If, on the other hand, one of the deviations differs remarkably in any way, then one cannot be sure which of the sensors is malfunctioning, or if there is any other disturbance in the process affecting the measured value.

Therefore, according to a preferred embodiment of the invention, the values of at least three process variables are measured, predicted, and compared as to their deviations between measured and predicted variables. By comparing the deviations of at least three process variables, the detection of a malfunctioning sensor can be done with significantly improved reliability. If the deviation of one of the variables differs significantly from the deviations of the other variables, it is probably due to malfunctioning of the corresponding sensor or due to malfunctioning of some specific process equipment, the function of which is related to the value of the variable in question. A certain process disturbance or variation might also be the reason for a deviation pattern erroneously indicating a malfunctioning sensor.

In order to further improve the reliability of the conclusions based on the comparison of the deviations for the variables in question, it is suggested that the number of measured and predicted process variables are at least four, preferably at least five, and that said process variables are divided into at least two groups, said groups having at least one common process variable, and that, for each group, the deviations between measured and predicted values of the variables of that group are compared and evaluated. Hence, if the deviation of such a common process variable differs significantly from the deviations of the other process variables in both groups that it belongs to, this will most probably be due to the malfunctioning of the sensor measuring the value of said variable. However, if the deviation of the variable in question differs significantly from the deviations of the variables in one of the groups to which it belongs, but not from the deviations of a second group to which it belongs, this is probably not due to malfunctioning of the sensor in question. In order to further develop the inventive method, the values of a plurality of process variables are measured and predicted, and the variables are divided into a plurality of groups.

For the purpose of further improving the method, based on which a computer based automatic diagnostic system can be built, the invention suggests that, upon the observation of a deviation pattern which indicates the malfunctioning of a sensor, a measurement of at least one further process variable, the value of which is related to the value of the variable measured by said sensor is initiated. Accordingly, the value of said further process variable is not continuously or repeatedly measured. For example, this variable might be one that has to be measured off-line by means of lab measurements. Accordingly, the invention suggests the initiation of such further measurements primarily only upon the observation of a deviation pattern indicating the malfunctioning of a certain sensor. Furthermore, the invention suggests that, upon observation of such a deviation pattern, the function of at least one process controlling means, the function of which is related to the value of the variable measured by said sensor, is checked. Such a process controlling means could be a valve, a pressure generator, a pump, or the like for a given process, for example a process for pulp and paper production.

The process variables, the values of which are measured and predicted can be concentrated to one and the same unit process. However, when the process, and an automatic diagnostic system built thereon, is more developed, the values of process variables in more than one, preferably all unit processes are measured and predicted. The values, the deviations of which are compared to each other are normally measured in one and the same unit process. However, as an alternative, deviations or process variables measured in different unit processes are executed in certain cases when this is found advantageous for the diagnosis.

The inventive method includes a simulation and an overall optimization of the process, said simulation and optimization being based on information concerning the result of said measurements and predictions of the process variables, the comparison of the deviations, and the observation of individual sensor malfunctioning, equipment malfunctioning, and/or process disturbances. The simulation and optimization are executed by means of one or more algorithms as described earlier in this application. The process is optimized with regard to any one or a combination of issues such as product quality, economy, environmental aspects, energy consumption, and maintenance. The maintenance optimization preferably concerns when certain sensors and certain process equipment should be repaired or replace. The simulation and optimization serve to set the set-points for a plurality of variables in the process with regard to what is being optimized. Here, the simulation and optimization is executed by the process model, which applies set-points to the control model.

The invention also comprises the use of so-called soft sensors. Such soft sensors could include models for predicting certain product qualities based on certain process variable values. In the case of a process for the production of pulp and paper, the soft sensing could include the prediction of, for example, paper strength based on the measurement of fiber size, distribution, NIR spectra, refiner energy input, and the like. Thanks to the inventive method, based on which an automatic diagnostic system can be built, such soft sensing can be more reliable. Preferably, the soft sensing plays a vital role for the optimization of the process, for example for the optimization with regard to the product quality.

According to one embodiment, the inventive method comprises a step of predicting the future value or values of certain process variables by means of an empirical model for one or more unit processes. This statistic-depending empirical model may be used to make adjustments of the physical model of the process. However, upon a rebuilding of the process, said empirical model is rebuilt based on the predictions made by means of a physical model.

The invention also refers to a computer based system as initially defined, which comprises means for executing an automatic diagnosis of the validity of the process data retrieved from the process for the purpose of preventing irrelevant process data from being used as input in the control model.

The diagnosis means comprises measuring means that comprise sensors for in-line, on-line and/or at-line measurement. It also comprises predicting means, observing means, and means for comparing and evaluating the observed deviations, said means preferably being arranged as software in a computer. The inventive system also comprises means arranged as a software in a computer for executing all other steps of the inventive method as defined above. Accordingly, the inventive system comprises a system for automatic diagnosis of the process in question. It may also comprise empirical models or algorithms for the optimization of the process based on information from the automatic diagnosis system.

Further features and advantages of the inventive method and system will be presented in the following description and in the enclosed, dependent claims.

BRIEF DESCRIPTION OF THE DRAWINGS

Hereinafter, the invention will be described by way of example with reference to the annexed drawings, in which.

DETAILED DESCRIPTION OF PREFERRED EMBODIMENTS

Figure 1:
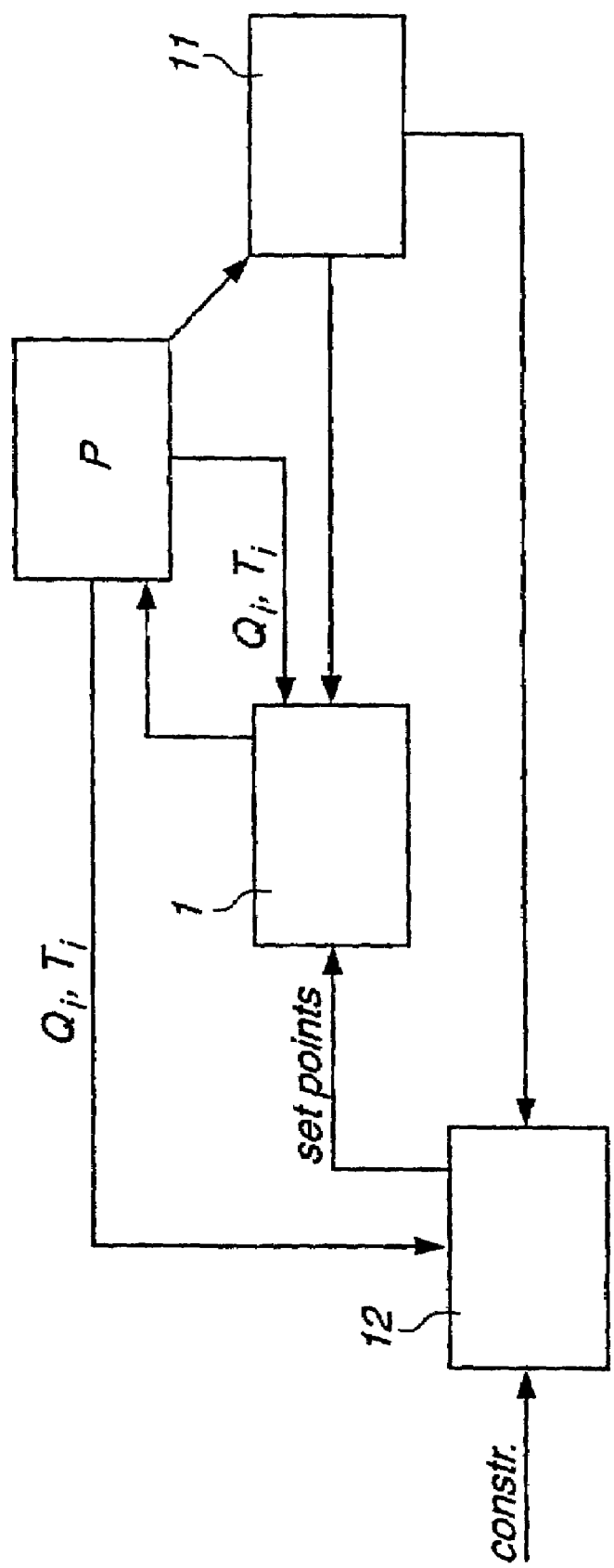
FIG. 1 is a schematic flow chart showing the essential ingredients in the inventive method and system.
Figure 2:
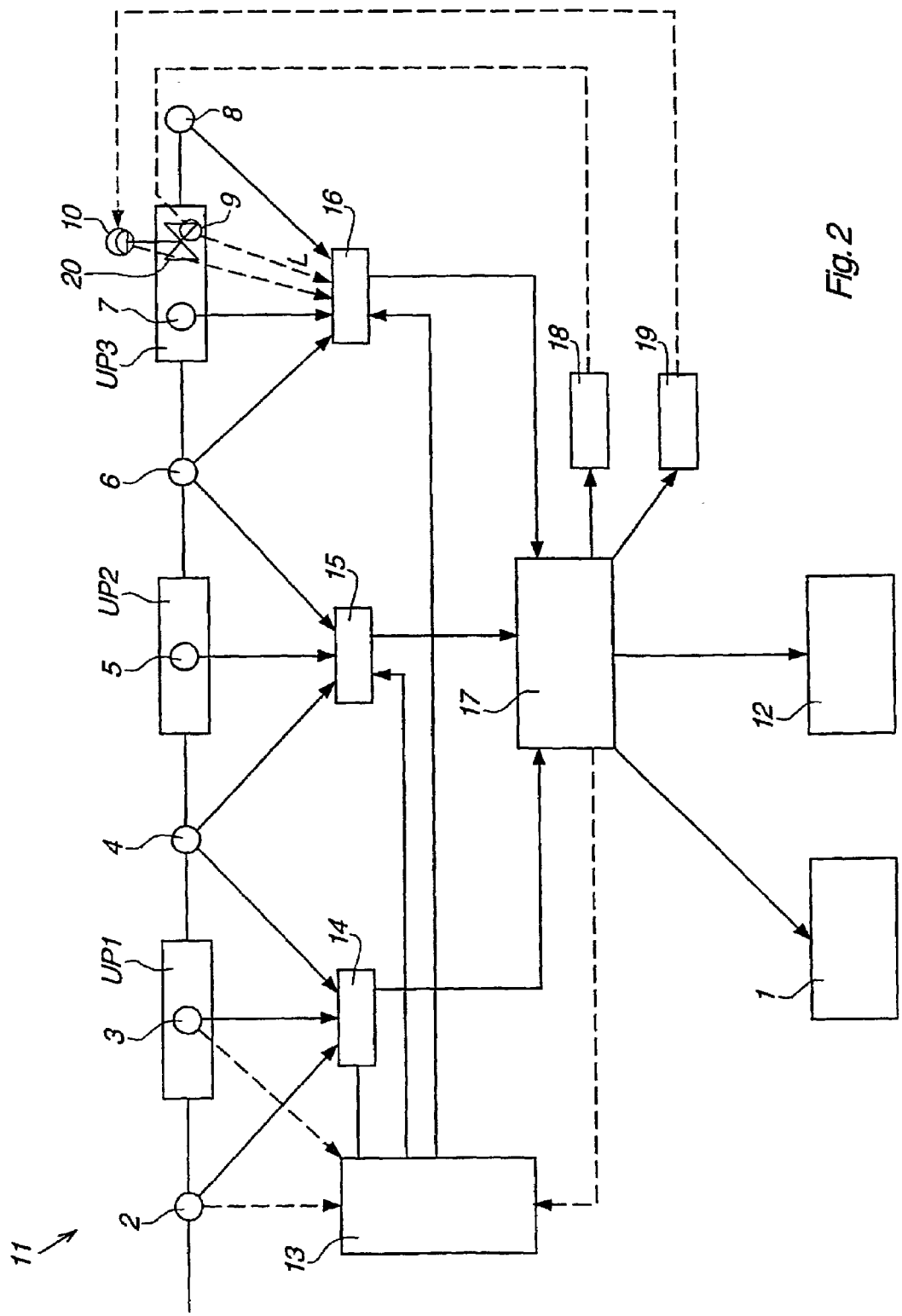
FIG. 2 is a more detailed, but still schematic flow chart of a diagnosis system according to the invention.

FIG. 1 shows a schematic flow chart of one embodiment of the inventive computer based system for controlling an industrial process P which comprises at least two unit processes UP1, UP2, UP3, see also FIG. 2. Here, the process P is a process for the production of pulp and paper or board. The unit processes UP1–3 could be the processes of a boiler, a digester, or any unit process normally present in such a process P. The unit processes UP1–3 may be continuous, semi-continuous, or discontinuous processes. The process P, however, is continuous or semi-continuous.

The inventive system comprises a control model 1 comprising one or more algorithms for controlling the process P. For this purpose, the control model needs to be updated with process data from the process P. Therefore, the inventive system comprises means 2–8 for delivering process data from the process P to the control model 1, the operation of the model being based on said process data. Such means for delivering process data include a plurality of sensors 2–8, preferably arranged for in-line, on-line and/or at-line measurement of a plurality of process variables $Q_i$, $T_i$.

According to FIGS. 1 and 2, the system also comprises means 11 for executing an automatic diagnosis of the validity of the process data retrieved from the process P by the measuring means 2–8 for the purpose of preventing irrelevant process data from being used as input in the control model 1. The diagnosis means 11 will be explained more in detail later with reference to FIG. 2. However, one of its main tasks is to prevent process data retrieved by malfunctioning sensors from being used as input in the control model 1.

The system also comprises a separate process model 12 for simulating the process. The process model 12, arranged as software in a computer, may include one or more physical models and/or empirical models for simulating the process. The process model 12 is adapted to update the control model 1, or, more precisely, provide the control model 1 with set point values for its operation. The set point values are set point values for different process variables or parameters. The process model 12 is adapted to simulate and optimize the process P with regard to one or more of a plurality of issues, such as product quality, process economy, environmental aspects, etc., with given constraints.

The system also comprises means 2–8, shown in FIG. 2, for providing the process model with process data which is used by the process model 12 for its operation. Said means 2–8 include a plurality of sensors, preferably arranged for in-line or on-line measurement of a plurality of process variables. According to the invention, the diagnosis means 11 is adapted to provide the process model 12 with information for the purpose of preventing irrelevant process data from being used as input in the process model 12. Typical such irrelevant or incorrect process data is process data delivered from malfunctioning sensors.

The diagnosis means 11, shown in detail in FIG. 2, plays a vital role in the system, and will therefore be described more in detail hereinafter.

The diagnosis means 11 comprises a model 13 for predicting the values of two or more, preferably a plurality of process variables $\hat{Q}_i$, $\hat{T}_i$ corresponding to the variables the state or values of which are measured by means of said means or sensors 2–8. For this purpose, the predicting model 13 is supplied with process data from the means 2–8. However, when the predicting model 13 predicts the value, for instance $\hat{Q}_i$, $\hat{T}_i$ of a certain variable, it executes its prediction without regard to the measured value $\hat{Q}_i$, $\hat{T}i$ of that specific variable. The predicting model 13 will be discussed more in detail later.

The system comprises means 14, 15, 16 for observing any deviation between the measured and the predicted value of each measured process variable. The means 14, 15, 16 preferably comprise comparators solely for comparing predicted values $\hat{Q}_i$, $\hat{T}_i$ and measured values $Q_i$, $T_i$ for the process variable over a given time-period.

The system also comprises a means 17 for comparing the observed deviations $\hat{Q}_i - Q_i$, $\hat{T}_i - T_i$ for the purpose of deciding the validity of the measured values, and in order to make it possible to decide whether the measured values of said variables should or should not be directly used as input to the control model 1 and the process model 12. In reality, a deviation pattern 21–23 will be supplied to the evaluating means 17 from the observing means 14, 15, 16, and the evaluating means 17 is arranged to evaluate the given pattern and observe deviations that make the pattern illogical. Upon an observation of such an illogical deviation pattern which, for example, indicates the malfunctioning of one or more sensors 2–8, the evaluating means 17 is adapted to activate a means 18 for initiating a measurement of at least one further process variable L, the value of which is related to the value of the variable or variables $Q_i$, $T_i$ measured by said sensor or sensors deemed to be malfunctioning, for the purpose of checking whether it really is the sensor or sensors in question that are malfunctioning or if there is any disturbance in the process which has lead to the illogic deviation pattern. For example, a further process variable to be measured upon such an observation might be the level L of a specific liquid in a given tank in one process unit. Here, such a measurement is executed by means of a sensor denoted 9 in unit process UP3. The measured value of this further variable is preferably compared to a predicted value thereof, or a given set point value for said variable, and any deviation between the measured value L of the further variable and its predicted value or set point value is supplied to the evaluating means 17. The evaluating means 17 is then adapted to analyse a new deviation pattern with regard to the result of the measurement of the further variable, in order to make sure if the original, illogical deviation pattern is due to malfunctioning sensors or due to some process error detected through the measurement of the further variable. For this purpose, the predicting model is supplied with the value L of the further variable, in order to take it into account when making new predictions.

The system preferably also comprises means 19 for initiating a check of the function of at least one process controlling means 20, the function of which is related to the value $Q_i$, $T_i$ of the variable or variables measured by the sensor or sensors that, according to the illogical deviation pattern seems or seem to be malfunctioning. Such a process controlling means could, for example, be a certain valve in the outlet of a tank. The initiating means 19 could, for example, initiate a measurement of the valve opening by means of a certain sensor like a flow meter, here a sensor denoted 10 as well as a valve position. Upon detection of a malfunctioning process controlling means, for example the valve 20, the system, preferably the evaluating means 17, is adapted to emit an alarm for the purpose of initiating either automatic or manual measures with regard to the concerned process controlling means 20.

Based on the result of its evaluating operation, the evaluating means 17 is adapted to provide information concerning malfunctioning sensors or process disturbances or errors to the control model 1 and the process model 12, respectively. Accordingly, the diagnosis means 11 defines an advanced, automatic diagnosis system used for the purpose of preventing incorrect process data from being used as input in the control model 1 and the process model 12.

According to the embodiment shown in FIG. 2, the measured process data are divided into a plurality of groups, and a deviation pattern is observed for each group. Every group has at least one process variable common with another group. In FIG. 2, this is indicated by the variables measured by the measuring means 4 and 6. By gathering the measured process data in different groups with predetermined data common for different groups, individual deviation patterns for each group can be observed by the means 14, 15, 16, and then handled by the evaluating means 17. By dividing the process data in groups in the described way, the deviations are presented to the evaluating means 17 in a way which promotes an efficient and reliable analysis by the evaluating means 17.

Figure 3A:
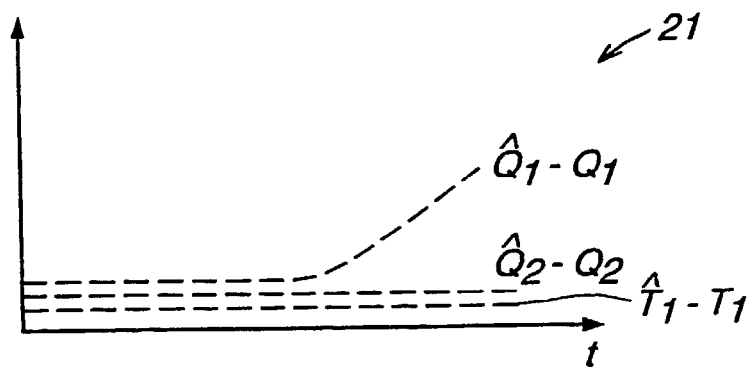
FIGS. 3a–c are examples of deviation patterns observed and treated by the diagnosis system.
Figure 3B:
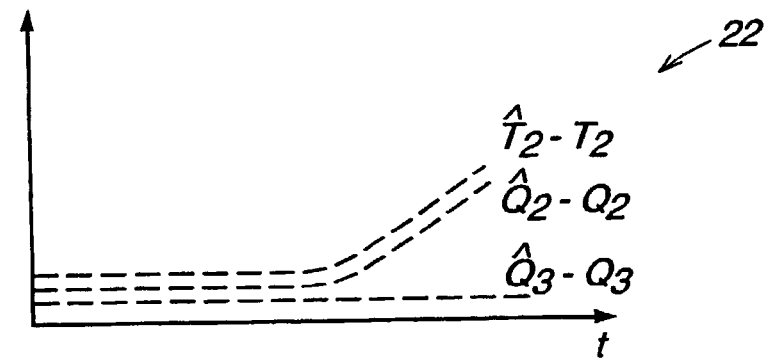
Figure 3C:
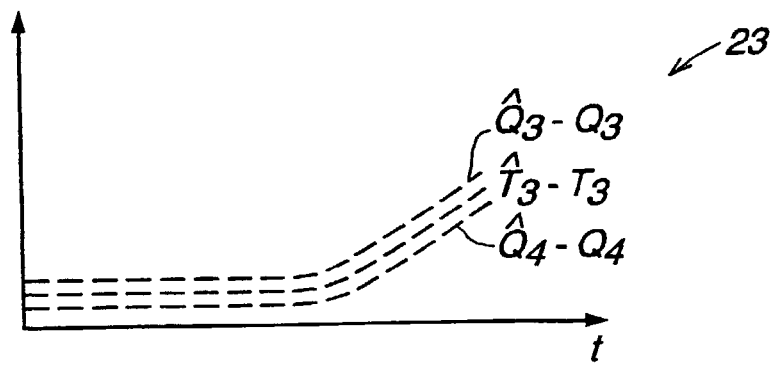

In FIGS. 3a–c $\hat{Q}_i$ indicates different predicted pressures, while $\hat{T}_i$ indicates different predicted temperatures. However, it should be understood that different systems according to the invention may use completely different values, and that this is only a very simple example of the principles of how to treat measured variables. $Q_i$ and $T_i$ indicates the measured values of said variables.

Figure 4:
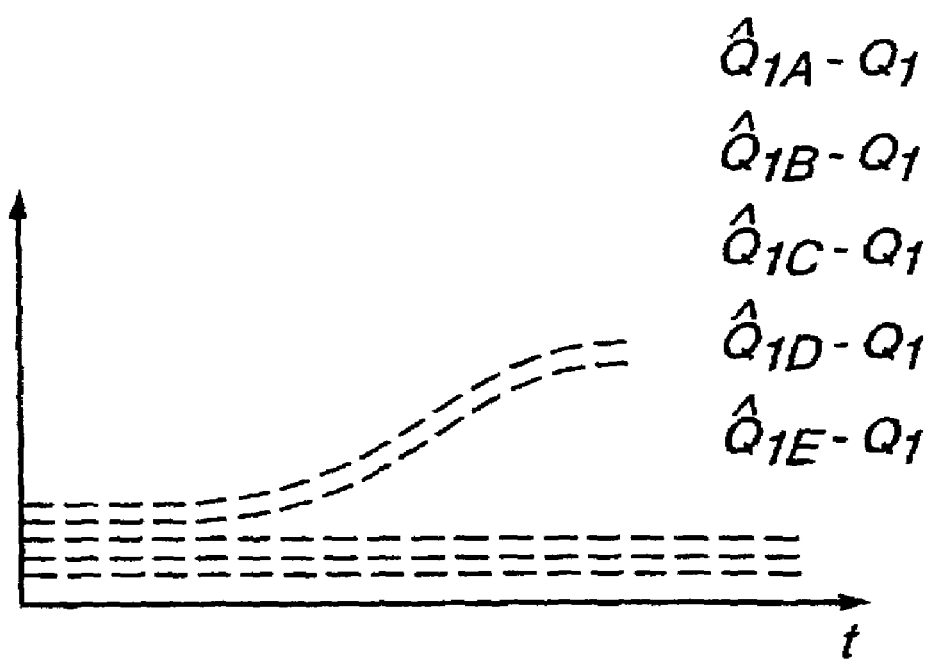
FIG. 4 is an example of a deviation pattern observed and treated in an alternative way by the diagnosis system.

FIG. 4 shows an alternative deviation pattern. Here, the predicting model 13 uses different sets of process data for prediction of $\hat{Q}_1$. For example, for $\hat{Q}_{1A}$, the model is adapted to make its prediction only with regard to a first set of measured variables. For the prediction of $\hat{Q}_{1B}$, it uses a modified set of measured variables, different from the one used when predicting $\hat{Q}_{1A}$. Accordingly, $\hat{Q}_{1C}$, $\hat{Q}_{1D}$, and $\hat{Q}_{1E}$ are all predicted with modified, i.e. different, sets of measured variables as input to the model 13. Alternatively, this could be regarded as a use of different, modified models in order to predict $\hat{Q}_1$. Preferably, the evaluating means 17 is adapted to analyse the deviation pattern of this kind. It should be understood that, for such a solution the observing means 14, 15, 16 could be regarded as modified and integrated with the evaluating means 17.

In FIG. 2, it is only shown, by way of example, with dashed lines from the sensors 2 and 3 to the predicting model 13 that process data is delivered from the measuring means 2–10 to the predicting model 13 as input to the latter. Preferably, the system permits measured variables from each of the means 2–10 to be delivered to the predicting model 13.

Preferably, the predicting model is based on physical laws for at least one of a hydraulic flow in the process, a mass balance in the process, and an energy, or temperature, balance in the process. Nevertheless, the model may also, when found suitable, comprise one or more empirical models for executing the necessary predictions.

Upon detection of certain discrepancies between model predictions and sensor measurements that cannot be related to be as due to process errors or malfunctioning sensors, an adjustment or upgrading of the model might be executed. When the predicting model 13 includes a physical model and an empirical model, the physical model is adapted to rebuild or replace the empirical model upon a rebuilding of the process. The rebuilding or replacement of the empirical model is based on predictions from the physical model.

Thanks to the invention, it will be possible to do on-line prediction of non-measured properties in a line for production of pulp and paper. Such properties could be yield, fiber or paper strength, bleachability, etc. It will be possible to measure different in-line and on-line properties, and correlated to lab measurements of the actual properties. The analysis of the reliability of these predictions can then be made by this signal check, as outlined above. New empirical models can be constructed where only reliable data can be identified automatically, without having to do a lot of manual checks.

By correlating the in-line, on-line and/or at-line measurements to on-line sampling measurements as well as lab measurements it is also possible to determine when the deviations are due to sensor problems or to process variations influencing the measurement. By measuring, for example NIR spectra, UV and other spectra further process parameters can be indirectly measured, and a state of the process be defined. Based on such measurements, and by simulating the process by means of the simulator, it will be possible to follow the passage of a certain batch through the line, and adjust for dilution, different reactions, etc. The new information is added to the knowledge in the simulator, and also process variation can be both predicted and compensated for in an adaptive way.

Of course, a plurality of embodiments of the invention will be obvious for a man skilled in the art without thereby leaving the scope of the invention as defined in the appended claims, supported by the description and the drawings.

Preferably, the predictions carried out by means of the predicting model 13 include the use of multi-variate data analysis and/or neural networks.

By permitting repeated modification of the process model 12, control model 1, and predicting model 13 based on the output from the automatic diagnose means 11, a very redundant control system is obtained. Preferably, all or almost all measures taken by the system are implemented by means of software in a computer environment.

The invention claimed is:

1. A computer based method for controlling an industrial process that includes at least two unit processes, comprising:
   directly controlling the industrial process by a control model including one or more algorithms;
   delivering process data from the industrial process to the control model;
   executing an automatic diagnosis of validity of the process data retrieved from the industrial process for preventing irrelevant process data from being used as an input in the control model,
   wherein the executing an automatic diagnosis includes executing at least two predictions of a given process variable with different sets of measured variables as an input to a predicting model for executing said at least two predictions, observing a deviation between a predicted value and a measured value of said process variable, and evaluating an observed deviation pattern for deciding whether the measured value of said process variable should or should not be used as the input in at least one of the control model and the separate process model.

2. A method according to claim 1, wherein when a specific process variable is predicted by the predicting model, the measured value of the specific process variable is excluded in the predicting model.

3. A method according to claim 1, wherein, upon an observation of a deviation pattern that indicates malfunctioning of a sensor, a measurement of at least one further process variable, a value of which is related to a value of the at least one further process variable measured by said sensor, is initiated and compared to a predicted value or set point value for said at least one further process variable.

4. A method according to claim 1, wherein, upon an observation of a deviation pattern that indicates malfunctioning of a sensor, a function of at least one process controlling means, a function of which is related to a value of a process variable measured by said sensor, is checked.

5. A method according to claim 1, wherein an overall optimization of the process is based on a result of said measurements and predictions of the process variables, evaluation of deviations, and observation of individual sensor malfunctioning.

6. A method according to claim 5, wherein the process is optimized with regard to at least one of product quality, economy, environmental aspects, energy consumption, and process equipment maintenance.

7. A method according to claim 1, wherein the predicting model comprises a physical model based on physical laws for at least one of:
   a hydraulic flow in the process;
   a mass balance in the process;
   an energy or a temperature balance in the process.

8. A method according to claim 7, wherein, upon detection of certain discrepancies between model predictions and measurements, an adjustment of the predicting model is executed based on a result of said measuring, prediction, and evaluation.

9. A method according to claim 7, wherein the predicting model includes an empirical model for its prediction, and wherein, upon a rebuilding of the process, said empirical model is rebuilt or replaced based on predictions from said physical model.

10. A method according to claim 1, wherein the process is a continuous or semi-continuous chemical process, for production of pulp and paper or board.

11. A method according to claim 1, wherein the process is simulated by a separate process model, and wherein the control model is updated by and provided with set point values from the separate process model.

12. A method according to claim 11, wherein the control model is modified by the separate process model based on the automatic diagnosis.

13. A method according to claim 11, wherein the separate process model is provided with process data from the process, and an operation of the separate process model is based on said process data.

14. A method according to claim 11, wherein the separate process model is provided with information from a diagnosis device for preventing the irrelevant process data from being used as an input in the separate process model.

15. A method according to claim 11, wherein the process is simulated and optimized with regard to one or more of a plurality of issues, with given constraints, by the separate process model.

16. A computer based method for controlling an industrial process that includes at least two unit processes, comprising:
   directly controlling the industrial process by a control model including one or more algorithms;

delivering process data from the industrial process to the control model;

executing an automatic diagnosis of validity of the process data retrieved from the industrial process for preventing irrelevant process data from being used as an input in the control model, wherein the executing an automatic diagnosis includes:

measuring a value of at least two process variables at at least one location in the process;

predicting said at least two process variables by a predicting model for a relevant part of the process and with given boundary conditions;

observing a deviation between a predicted value and a measured value of each of said at least two process variable; and evaluating the observed deviation for deciding whether any of the measured values of said process variables should or should not be used as the input in at least one of the control model and the separate process model.

17. A method according to claim 16, wherein values of at least three process variables are measured, predicted, and evaluated as to their individual deviations between measured and predicted values.

18. A method according to claim 16, wherein a number of measured and predicted process variables is at least four; and wherein said process variables are divided into at least two groups, said two groups having at least one common process variable, and wherein, for each respective group, deviations between measured and predicted values of the process variables of that respective group are compared.

19. A method according to claim 16, wherein the process is simulated by a separate process model, and wherein the control model is updated by and provided with set point values from the separate process model.

20. A method according to claim 19, wherein the control model is modified by the separate process model based on the automatic diagnosis.

21. A method according to claim 19, wherein the separate process model is provided with process data from the process, and an operation of the separate process model is based on said process data.

22. A method according to claim 19, wherein the separate process model is provided with information from a diagnosis device for preventing the irrelevant process data from being used as an input in the separate process model.

23. A method according to claim 19, wherein the process is simulated and optimized with regard to one or more of a plurality of issues, with given constraints, by the separate process model.

24. A method according to claim 16, wherein the process is a continuous or semi-continuous chemical process, for production of pulp and paper or board.

25. A computer based system, for controlling an industrial process including at least two unit processes, said system comprising:

a control model including one or more algorithms for directly controlling the industrial process;

means for delivering process data from the industrial process to the control model, operation of the control model being based on said process data;

diagnosis means for executing an automatic diagnosis of validity of the process data retrieved from the industrial process for preventing irrelevant process data from being used as an input in the control model, wherein the diagnosis means includes:

means for measuring a value of at least two process variables at at least one location in the process;

means for predicting values of at least one process variable with different sets of measured variables as an input to a predicting model;

means for observing a deviation between predicted and measured values of said process variable and for evaluating observed deviations for deciding a validity of the measured value of said process variable as an input to at least one of the control model and the process model.

26. A computer based system according to claim 25, wherein the predicting means excludes a measurement of a certain process variable as an input when predicting a value of that certain process variable.

27. A computer based system according to claim 25, wherein the predicting means includes a model based on physical laws for at least one of a hydraulic flow in the process, a mass balance in the process, and an energy balance in the process.

28. A computer based system according to claim 27, wherein the evaluating means adjusts the physical model upon observation of a certain discrepancy between model predictions and sensor measurements.

29. A computer based system according to claim 25, wherein the process model for simulating the process is configured to execute an overall optimization of the process based on the process data delivered to it as an input and as a result of measurements and predictions of process variables, evaluation of deviations, and observation of individual sensor malfunctioning by the diagnosis means.

30. A computer based system according to claim 29, wherein the process model is configured to optimize the process with regard to at least one of product quality, total economy, environmental aspects, energy consumption, and maintenance of process equipment.

31. A computer based system according to claim 25, wherein the process is a continuous or semi-continuous chemical process.

32. Use of a computer based system according to claim 25 for controlling an industrial process.

33. Use of a computer based system according to claim 25 for controlling a process for manufacturing pulp and paper or board.

34. A computer based system according to claim 25, further comprising a process model for simulating the process, said process model configured to update the control model and provide the control model with set point values for its operation.

35. A computer based system according to claim 34, wherein the process model is configured to modify the control model based on process data validity information from the diagnosis means.

36. A computer based system according to claim 34, further comprising means for providing the process model with process data, and an operation of the process model is based on said process data.

37. A computer based system according to claim 34, wherein the diagnosis means provides the process model with information for preventing irrelevant process data from being used as an input in the process model.

38. A computer based system according to claim 34, wherein the process model is configured to simulate and optimize the process with regard to one or more of a plurality of issues, with given constraints.

39. A computer based system, for controlling an industrial process including at least two unit processes, said system comprising:

a control model including one or more algorithms for directly controlling the industrial process;

means for delivering process data from the industrial process to the control model, operation of the control model being based on said process data;

diagnosis means for executing an automatic diagnosis of validity of the process data retrieved from the industrial process for preventing irrelevant process data from being used as an input in the control model, wherein the diagnosis means includes:

means for measuring a value of at least two process variables at at least one location in the process;

means for predicting the values of said at least two process variables by a predicting model for a relevant part of the process and with given boundary conditions;

means for observing a deviation between measured and predicted values of each of said at least two process variables; and means for evaluating observed deviations for deciding a validity of the measured values of said process variables as an input to at least one of the control model and the process model.

40. A computer based system according to claim 39, wherein values of at least three process variables are measured, predicted, and evaluated as to their deviations.

41. A computer based system according to claim 39, wherein a number of predicted process variables is at least four, wherein said process variables are divided into at least two groups having at least one common process variable, and further comprising means for comparing and evaluating, for each respective group, deviations between predicted and measured values of the variables of that respective group.

42. A computer based system according to claim 41, wherein the measured values are measurements, by sensors, and wherein evaluating means observe a deviation pattern that indicates malfunctioning of any of the sensors.

43. A computer based system according to claim 42, further comprising means for initiating a measurement of at least one further process variable, a value of which is related to a value of the variable measured by one of the sensors, upon observation of said deviation pattern indicating a malfunctioning sensor.

44. A computer based system according to claim 42, further comprising means for initiating a checking of a function of at least one process controlling means, a function of which is related to a value of the process variable measured by one of the sensors, upon observation of said deviation pattern indicating a malfunctioning sensor.

45. A computer based system according to claim 39, further comprising a process model for simulating the process, said process model configured to update the control model and provide the control model with set point values for its operation.

46. A computer based system according to claim 45, wherein the process model is configured to modify the control model based on process data validity information from the diagnosis means.

47. A computer based system according to claim 45, further comprising means for providing the process model with process data, and an operation of the process model is based on said process data.

48. A computer based system according to claim 45, wherein the diagnosis means provides the process model with information for preventing irrelevant process data from being used as an input in the process model.

49. A computer based system according to claim 45, wherein the process model is configured to simulate and optimize the process with regard to one or more of a plurality of issues, with given constraints.

50. A computer based system according to claim 39, wherein the process is a continuous or semi-continuous chemical process.

51. Use of a computer based system according to claim 39 for controlling an industrial process.

52. Use of a computer based system according to claim 39 for controlling a process for manufacturing pulp and paper or board.

* * * * *